(12) United States Patent
Gries

(10) Patent No.: US 9,302,563 B2
(45) Date of Patent: Apr. 5, 2016

(54) ELECTRIC HEATER

(71) Applicant: MAHLE International GmbH, Stuttgart (DE)

(72) Inventor: Jean-Philippe Gries, Colmar (FR)

(73) Assignee: MAHLE International GmbH, Stuttgart (DE)

(*) Notice: Subject to any disclaimer, the term of this patent is extended or adjusted under 35 U.S.C. 154(b) by 0 days.

(21) Appl. No.: 14/518,606

(22) Filed: Oct. 20, 2014

(65) Prior Publication Data
US 2015/0108112 A1    Apr. 23, 2015

(30) Foreign Application Priority Data

Oct. 22, 2013  (EP) .................................... 13290252

(51) Int. Cl.
| | |
|---|---|
| *H05B 1/02* | (2006.01) |
| *B60H 1/22* | (2006.01) |
| *H05B 3/14* | (2006.01) |
| *F24H 3/04* | (2006.01) |
| *F24H 9/18* | (2006.01) |
| *H05B 3/50* | (2006.01) |

(52) U.S. Cl.
CPC ............ *B60H 1/2225* (2013.01); *F24H 3/0429* (2013.01); *F24H 3/0435* (2013.01); *F24H 3/0441* (2013.01); *F24H 9/1872* (2013.01); *H05B 1/0236* (2013.01); *H05B 3/141* (2013.01); *H05B 3/50* (2013.01); *F24H 2250/04* (2013.01); *H05B 2203/02* (2013.01); *H05B 2203/023* (2013.01); *H05B 2203/037* (2013.01)

(58) Field of Classification Search
CPC .. B60H 1/2225; H05B 1/0236; H05B 1/0238; H05B 3/141; H05B 3/12; H05B 3/18; H05B 3/50; H05B 2203/02; F24H 3/0429; F24H 3/0435; F24H 3/0441; F24H 9/1872

USPC ......... 219/483–486, 494, 504, 505, 539, 542, 219/543
See application file for complete search history.

(56) References Cited

U.S. PATENT DOCUMENTS

| | | | |
|---|---|---|---|
| 6,720,536 B2* | 4/2004 | Bohlender | 219/504 |
| 6,875,962 B2* | 4/2005 | Uhl et al. | 219/530 |
| 2015/0034626 A1* | 2/2015 | Kominami et al. | 219/483 |

FOREIGN PATENT DOCUMENTS

| | | |
|---|---|---|
| EP | 1 626 231 A1 | 2/2006 |
| EP | 1 926 346 A1 | 5/2008 |
| WO | WO 02/057100 A1 | 7/2002 |

OTHER PUBLICATIONS

European Search Report for European Application No. 13290252.9 dated Apr. 1, 2014.

*Primary Examiner* — Mark Paschall
(74) *Attorney, Agent, or Firm* — Muncy, Geissler, Olds & Lowe, P.C.

(57) ABSTRACT

An electric heater for an automobile vehicle, with an electronic controller and a heat transmitting net, whereby the heat transmitting net contains a multitude of PTC-heating elements, a multitude of contact sheets and heat dissipating fins, whereby the PTC-heating elements are respectively arranged between two adjacent contact sheets and form a heating element with the contact sheets whereby some of the contact sheets are connected to connectors, which are arranged at the electronic controller and are connected to either a positive pole of a power supply or a negative pole of a power supply and are arranged in an alternating order, whereby the quantity of connectors that are connected to a positive pole of a power supply and the quantity of connectors that are connected to a negative pole of a power supply differs by one.

12 Claims, 1 Drawing Sheet

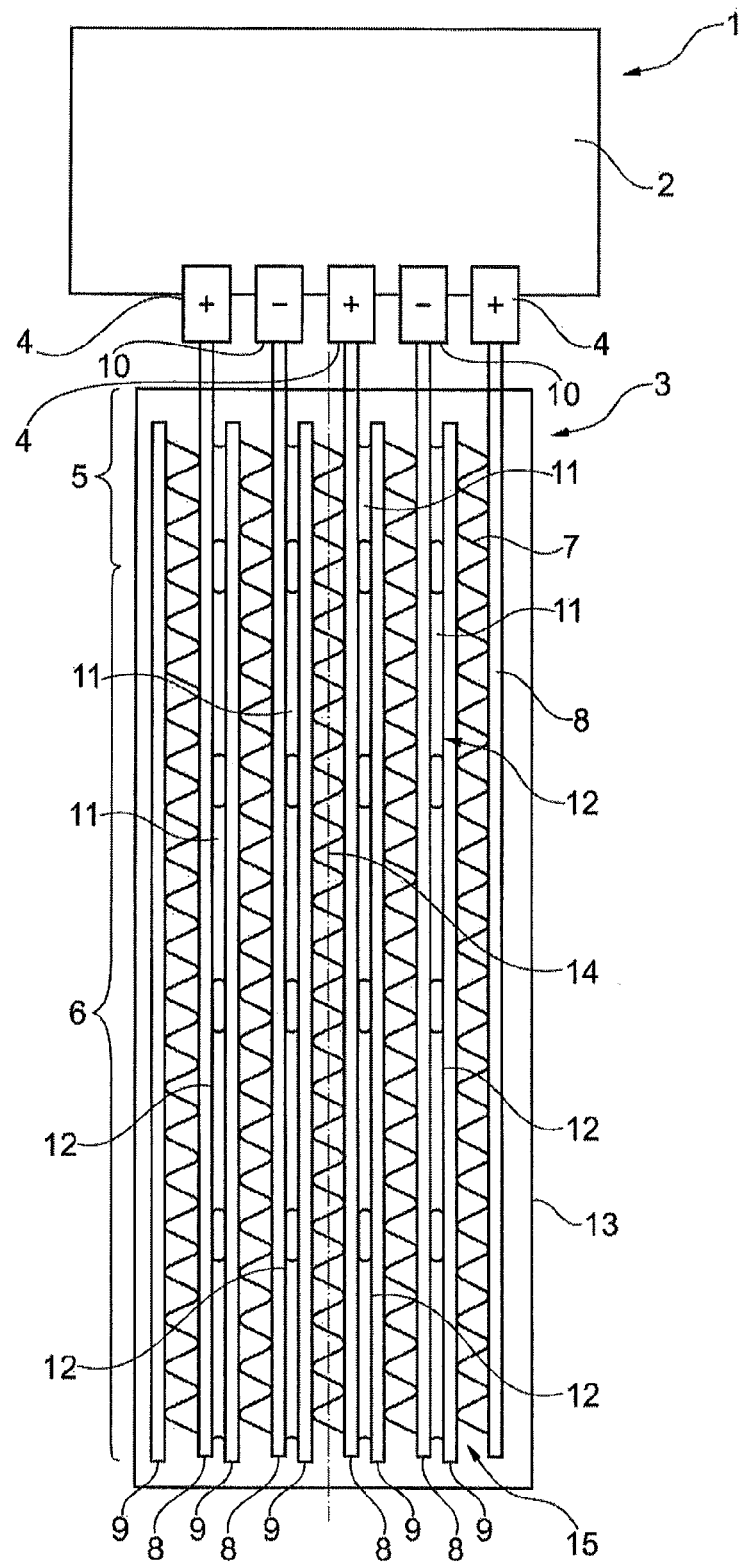

ELECTRIC HEATER

This nonprovisional application claims priority under 35 U.S.C. §119(a) to European Patent Application No. EP 13290252.9, which was filed on Oct. 22, 2013, and which is herein incorporated by reference.

BACKGROUND OF THE INVENTION

1. Field of the Invention

The present invention relates to an electric heater for an automobile vehicle, with an electronic controller and a heat transmitting net, whereby the heat transmitting net contains a multitude of PTC-heating elements, a multitude of contact sheets and heat dissipating fins, whereby the PTC-heating elements are respectively arranged between two adjacent contact sheets and form a heating element with the contact sheets, whereby some of the contact sheets are connected to connectors, which are arranged at the electronic controller and are connected to either a positive pole of a power supply or a negative pole of a power supply and are arranged in an alternating order.

2. Description of the Background Art

An electric heater can be used to further enlarge the heating capacity of a heating system in automobiles. Electric heaters can feature a multitude of positive temperature coefficient (PTC) elements, that can be used to transform electric energy into heat energy, which can be used to heat up an airflow within a HVAC-system (heating, ventilation and air conditioning).

Usually PTC-heaters are tailor-made for a specific vehicle or for a specific HVAC-system. Therefore they cannot be used in other vehicles. PTC-heaters can often be installed only in one specific direction within a vehicle or within a specific HVAC-system.

PTC-heaters usually have a first part, that is used to cool down the electric controller of the PTC-heater, and a second part, that is used to heat up an airflow. To cool the electronic controller, air can flow through the first part of the PTC-heater. The air flowing through the second part can thus be heated by the PTC-heating elements.

PTC-heaters known in the conventional art usually offer a specific design of the frame that holds the PTC-heating elements, the heat dissipating fins and the electric contacts of the PTC-heating elements. Furthermore the orientation of the electric controller relative to this frame is usually fixed and specific to the vehicle and/or the HVAC-system used in the vehicle.

It is disadvantageous that, due to the specific design of the PTC-heaters known in the conventional art, the flexibility to use a certain PTC-heater in different vehicles or different HVAC-systems is limited.

SUMMARY OF THE INVENTION

It is therefore an object of the present invention to provide an electric heater, which offers a bigger flexibility in the orientation of the electronic controller relative to the rest of the electric heater. Furthermore the electric heater should be easily producible.

According to an embodiment of the invention, an electric heater for an automobile vehicle is provided, with an electronic controller and a heat transmitting net, whereby the heat transmitting net contains a multitude of PTC-heating elements, a multitude of contact sheets and heat dissipating fins, whereby the PTC-heating elements are respectively arranged between two adjacent contact sheets and form a heating element with the contact sheets, whereby some of the contact sheets are connected to connectors, which are arranged at the electronic controller and are connected to either a positive pole of a power supply or a negative pole of a power supply and are arranged in an alternating order, whereby the quantity of connectors that are connected to a positive pole of a power supply and the quantity of connectors that are connected to a negative pole of a power supply differs by one.

The electric heater offers connectors, which are connected to a positive pole of a power supply (positive connectors), and connectors, which are connected to a negative pole of a power supply (negative connectors). The number of positive connectors and the number of negative connectors differs by one, so that there is either one more positive connector or one less positive connector than negative connectors. This is beneficial because the uneven distribution between positive connectors and negative connectors allows the heat transmitting net to be connected in two different orientations, whereby the difference between the two orientations is that the heat transmitting net is flipped 180° around a centerline, which runs parallel to the contact sheets in the middle of the heat transmitting net.

The different quantities of positive connectors and negative connectors paired with the fact that the connectors are arranged in an alternating order leads to a buildup of the electric heater, which contains either positive connectors or negative connectors as the two outermost connectors of the electronic controller. Therefore the sequence of the connectors is the same from both sides, which gives the possibility to connect the heat transmitting net in two different orientations relative to the electronic controller without the need to adapt the heat transmitting net.

The possibility to flip the heat transmitting net while keeping the orientation of the electronic controller allows a higher flexibility in terms of utilization of the available installation space, which is usually very limited in vehicles. The electric heater can thus be used in a wider variety of different vehicles and HVAC-systems. This is especially useful, when the heat transmitting net is not symmetrical in terms of extension from the centerline or when it has protrusions on one side.

According to an embodiment of the invention, the heat transmitting net features a first heat transmitting area and a second heat transmitting area, whereby the PTC-heating elements are arranged only within the second area.

The first heat transmitting area features no PTC-heating elements. Air can flow through the first heat transmitting area and overflow the contact sheets, which are connected to the electronic controller. By this overflow the heat generated by the electronic controller can be dissipated from the electric heater. The first heat transmitting area is therefore predominantly a cooling area for the electronic controller.

The second heat transmitting area features a multitude of PTC-heating elements, which can be used to heat up an airflow, which can flow through the heat transmitting net. The second heat transmitting area is therefore predominantly a heating area for the passing airflow.

The separation of the electric heater in a cooling area and a heating area is beneficial because it increases the efficiency of the electric heater and allows the electric controller to be maintained at a safe temperature level.

In a further embodiment, the first area features a multitude of distance elements, which are arranged between adjacent contact sheets in a way, that they create a distance between these adjacent contact sheets.

The distance elements can be shaped exactly like the PTC-heating elements in the second area. They are used to keep the distance between the two adjacent contact sheets, which is generated by the PTC-heating elements in the second area. The distance elements act as placeholders, which can be used instead of the PTC-heating elements without changing the general buildup of the electric heater. Since the distance elements are predominantly positioned within the first area and furthermore do not generate heat, the first area of the heat transmitting net can be used as a cooling area for the electronic controller.

The first area can be arranged at the end of the heat transmitting net, which faces the electronic controller, whereas the second area is arranged at the end of the heat transmitting net, which is facing away from the electronic controller.

This is advantageous as the first area is used as a cooling area for the electronic controller.

The electronic controller can feature heat dissipating elements, which extend into the first area of the heat transmitting net.

The contact sheets, which are connected to the connectors of the electronic controller, act as heat dissipating elements. To increase the heat dissipation additional heat dissipating elements, such as fins, can protrude from the electronic controller and extend into the first area of the heat transmitting net. This is beneficial as more heat can be dissipated from the electronic controller. The additional heat dissipating elements can preferably be positioned between the connectors and should be connected to the heat generating parts of the electronic controller in a thermally conductive way.

Furthermore, some of the contact sheets can protrude from the heat transmitting net and can be connected to the connectors of the electronic controller, whereby the number of protruding contact sheets can be equal to the number of connectors.

At least one contact sheet of each heating element can be designed to fit in one connector of the electronic controller. A conductive connection between the PTC-heating elements, which are in contact with the contact sheets, and the poles of a power supply, which are connected to the connectors, can be obtained via the contact sheets, which are plugged into the connectors.

Furthermore it is beneficial, if the PTC-heating elements are distributed substantially symmetrical with respect to a centerline, which divides the heat transmitting net in a left area and a right area, whereby the centerline runs parallel to the contact sheets from the end of the heat transmitting net, which faces the electronic controller, to the far side of the heat transmitting net.

A symmetrical distribution is beneficial to obtain a constant heat distribution across the heat transmitting net. Furthermore it is advantageous as the heat transmitting net can be flipped 180° relative to the electronic controller, which would change the heat distribution across the heat transmitting net, if the PTC-heating elements would be distributed in an unsymmetrical way. This is especially advantageous as the heat distribution stays constant with respect to the structures that surround the electric heater in a vehicle, regardless of the orientation of the heat transmitting net relative to the electronic controller.

At least one heating element can feature PTC-heating elements, which are arranged in the second area of the heat transmitting net, and distance elements, which are arranged in the first area and the second area of the heat transmitting net.

The maximum heat capacity, which can be generated by one heating element, can be influenced by the number of PTC-heating elements, which are arranged within the heating element. To obtain heating elements with lower heat generation capacity, PTC-heating elements can be replaced by distance elements. It is advantageous to have heating elements with a higher heat generating capacity and heating elements with a lower heat generating capacity within one electrical heater to achieve a higher flexibility and to have the possibility to create different heat distributions over the heat transmitting net.

The heat transmitting net can be connected to the electronic controller in two different orientations, whereby the first orientation and the second orientation differ in that the heat transmitting net is flipped about 180° around the centerline of the heat transmitting net.

As described before, the possibility to flip the heat transmitting net 180° around its centerline offers a higher flexibility regarding the assembly of the electric heater and furthermore a better utilization of the available installation space can be achieved.

In an embodiment, the heating elements can be activated individually through the electronic controller.

Through the possibility to activate the heating elements individually, a higher flexibility can be achieved as either heating elements with a higher heat generating capacity or heating elements with a lower heat generating capacity or a combination of both types of heating elements can be activated. This gives the possibility to adjust the heat output of the electric heater to the heat demand of the HVAC-system.

By the possibility to activate the heating elements individually, the heat generated within the electric heater can easily be adapted to the requirements. This can be done by simple switches, which allow activating or deactivating the individual heating elements. This is beneficial as the electronic controller can be designed less complex.

If all heating elements would offer the same heat generating capacity, it would be much more challenging to adapt the heat generation, as a PWM (pulse width modulation) signal would be needed to adapt the heat generation. With a PWM signal it is possible to activate the PTC-heating elements in a pulsed way only for a certain amount of time, which offers the possibility to regulate and adapt the heat generation. The design and buildup of an electronic controller, which is capable of emitting a PWM signal, is much more complex.

The heating elements can be activated through the electronic controller in a way, in which the heat production of the heating elements and the heat distribution is independent of the orientation of the heat transmitting net relative to the electronic controller.

This is beneficial as the heat transmitting net can be flipped 180° with respect to the electronic controller. To avoid a change of temperature distribution across the heat transmitting net, it is preferable that the heat distribution remains unchanged and independent of the actual orientation of the heat transmitting net relative to the electrical controller. This can be achieved either by the distribution of the PTC-heating elements or the heating elements within the heat transmitting net and/or by a controlled activation of the heating elements. As mentioned before it is important to have a symmetrical distribution of the heating elements with respect to the centerline.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the sole FIGURE shows a view of an electric heater, which includes a heat transmitting net and an electronic controller.

DETAILED DESCRIPTION

FIG. 1 shows a view of an electric heater 1. The electric heater 1 features an electronic controller 2, which is used to control the electric heater 1, and a heat transmitting net 3. The electronic controller 2 is connected to a power supply (not shown in FIG. 1). At the lower end of the electronic controller 2 a multitude of connectors 4, 10 is shown. The connectors marked with the reference number 4 are connected to a positive pole of a power supply. The connectors marked with the reference number 10 are connected to a negative pole of a power supply. The connectors 4, 10 are arranged in an alternating order at the lower end of the electronic controller 2.

The heat transmitting net 3 features a multitude of heating elements 15, which have a contact sheet 8 and a contact sheet 9. Furthermore a multitude of PTC-heating elements 12 and distance elements 11 is arranged between the contact sheets 8, 9. The contact sheets 8 are connected to either a positive connector 4 or a negative connector 10. Each contact sheet 9 is connected to the contact sheet 8 of the heating element 15, which is adjacent to it on the right side. The connection between the contact sheets 8, 9 is created through the heat dissipating fins 7, which are arranged between the heating elements 15. The contact sheets 8, 9 and the heat dissipating fins 7 are conductive. Through the connection of the contact sheets 8 with the connectors 4, 10 and the connection of the contact sheets 9 with the contact sheets 8 of the adjacent heating element 15, it is realized that the PTC-heating elements 12 between the contact sheets 8, 9 are connected to a power supply within a closed electrical circuit. Thus the PTC-heating elements 12 can generate heat by applying an electric current to them.

The positive connectors 4 and the negative connectors 10 are arranged in an alternating order along a row at the bottom side of the electronic controller 2. The number of positive connectors 4 is three and the number of negative connectors 10 is 2. A different distribution between positive and negative connectors can be realized in alternative embodiments, as long as the number of positive connectors 4 is either one more or one less than the number of negative connectors 10. This is to make sure, that the sequence of connectors 4, 10 is the same from the left side of the electronic controller 2 as it is from the right side of the electronic controller 2.

The heat transmitting net 3 is divided in two areas 5, 6. The first area 5 is located at the side of the heat transmitting net 3, which faces the electronic controller 2. The second area is located at the far side of the heat transmitting net 3.

Only distance elements 11, which cannot generate heat, are arranged within the first area 5. Within the second area 6 distance elements 11 and PTC-heating elements 12 are arranged within the heating elements 15. The heating elements 15 at the left end and the right end of the heat transmitting net 3 contain four PTC-heating elements 12 and one distance element 11. The two heating elements 15 in the middle of the heat transmitting net 3 contain two PTC-heating elements 12 and three distance elements 11 respectively. A different distribution of PTC-heating elements and distance elements in the heating elements can be realized in alternative embodiments.

The first area 5 is used to dissipate the heat generated by the electronic controller 2. The heat is submitted into the first area 5 via the contact sheets 8 that are connected to the connectors 4, 10. An airflow that flows through the first area 5 dissipates the heat away from the contact sheets 8. The heat dissipating fins 7, the distance elements 11 and the contact sheets 9, which are located in the first area 5, can also contribute to the dissipation of the heat from the electronic controller 2, as they have a thermally conductive connection to the contact sheets 8. As the first area 5 predominantly helps to cool the electronic controller 2 it is also called cooling area 5.

The second area 6, which features the PTC-heating elements 12, is used to generate heat by the activation of the heating elements 15. The second area 6 is therefore also called heating area 6. The number of distance elements 11 used within the heating area 6 influences the maximum heat generating capacity of each heating element 15 respectively and thus the maximum heat generating capacity of the whole electric heater 1.

The heat transmitting net 3 or at least the heating elements 15 are arranged symmetrical to the centerline 14, which runs parallel to the contact sheets 8, 9. Due to this symmetrical buildup it is possible to flip the heat transmitting net 3 around 180° around the centerline without changing the heat distribution across the heat transmitting net 3. The possibility to flip the heat transmitting net 3 around offers a bigger flexibility as the electric heater 1 can be better adjusted to installation space requirements. This is beneficial as the electric heater 1 can be used in a wider variety of HVAC-systems or vehicles.

The heat transmitting net 3 can be cased within a frame 13, which helps to position the heat transmitting net 3 against surrounding structures in the vehicle or the HVAC-system. Furthermore the frame 13 increases the stability of the electric heater 1.

The heating elements 15 can easily be switched on or off independently from each other. This gives the possibility to realize different heating scenarios. These different heating scenarios are depending on the number of PTC-heating elements 12 within the individual heating elements 15. The heating scenarios differ in the generated heat and the heat distribution across the heat transmitting net 3.

An exemplary heating scenario might be to activate the two heating elements 15 in the middle, which would activate the four PTC-heating elements 12. This would correlate with ⅓ of the overall heating capacity, as the total number of PTC-heating elements 12 is twelve in FIG. 1. A second Scenario would activate the left and the right heating element 15 only, which feature four PTC-heating elements 12 respectively. This would correlate with ⅔ of the overall heating capacity. A third scenario might activate all four heating elements 15, and hence all PTC-heating elements 12 within the electric heater 1, which correlates with 100% of the overall heating capacity. Alternative heating scenarios can also be realized.

Due to the symmetrical buildup of the heat transmitting net 3 and the above described heating scenarios the heat distribution across the heat transmitting net 3 is independent from the orientation of the heat transmitting net 3 relative to the electrical controller 2.

While the invention has been shown in FIG. 1 in a preferred embodiment, it will be clear to those skilled in the arts to which it pertains that a variety of modifications and changes can be made thereto without departing from the scope of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electric heater for an automobile vehicle, the electric heater comprising:
   an electronic controller; and
   a heat transmitting net having a plurality of PTC-heating elements, a plurality of contact sheets, and heat dissipating fins, the PTC-heating elements being respectively arranged between two adjacent contact sheets and form a heating element with the contact sheets,
   wherein a portion of the contact sheets are connected to connectors that are arranged at the electronic controller and are connected to either a positive pole of a power supply or a negative pole of a power supply and are arranged in an alternating order, and
   wherein a quantity of connectors that are connected to a positive pole of a power supply and a quantity of connectors that are connected to a negative pole of a power supply differs by one,
   wherein the heat transmitting net has a first heat transmitting area and a second heat transmitting area, and wherein the PTC-heating elements are arranged only within the second heat transmitting area, and
   wherein the first heat transmitting area is arranged at a first end of the heat transmitting net that is closest to the electronic controller, and the second heat transmitting area is arranged adjacent to the first heat transmitting area and extends to a second end of the heat transmitting net that is opposite the first end of the heat transmitting net, such that the second heat transmitting area is positioned farther away from the electronic controller than the first heat transmitting area.

2. The electric heater as claimed in claim 1, wherein the first heat transmitting area has a plurality of distance elements that are arranged between adjacent contact sheets such that they create a distance between these adjacent contact sheets.

3. The electric heater as claimed in claim 1, wherein the electronic controller comprises heat dissipating elements, which extend into the first heat transmitting area of the heat transmitting net.

4. The electric heater as claimed in claim 1, wherein a portion of the contact sheets protrude from the heat transmitting net and are connected to the connectors of the electronic controller, and wherein a number of protruding contact sheets is equal to a number of connectors.

5. The electric heater as claimed in claim 1, wherein the PTC-heating elements are distributed substantially symmetrical with respect to a centerline, which divides the heat transmitting net into a left area and a right area, and wherein the centerline runs parallel to the contact sheets from the first end of the heat transmitting net to the second end of the heat transmitting net.

6. The electric heater as claimed in claim 1, wherein at least one heating element has PTC-heating elements, which are arranged in the second heat transmitting area of the heat transmitting net, and wherein distance elements are arranged in the first heat transmitting area and the second heat transmitting area of the heat transmitting net.

7. The electric heater as claimed in claim 1, wherein the heat transmitting net is connectable to the electronic controller in two different orientations, and wherein the first orientation and the second orientation differ in that the heat transmitting net is flipped about 180° around a centerline of the heat transmitting net.

8. The electric heater as claimed in claim 1, wherein the heating elements are activated individually through the electronic controller.

9. The electric heater as claimed in claim 1, wherein the heating elements are activated through the electronic controller such that the heat production of the heating elements and the heat distribution is independent of an orientation of the heat transmitting net relative to the electronic controller.

10. The electric heater as claimed in claim 1, wherein the heat transmitting net has an even number of contact sheets.

11. The electric heater as claimed in claim 1, wherein the contact sheets are divided into pairs of contact sheets, wherein a first contact sheet of each pair of contact sheets is connected to a respective connector and wherein the heat dissipating fins are provided between the first contact sheet and a second contact sheet of each pair of contact sheets.

12. The electric heater as claimed in claim 2, wherein the distance elements do not generate heat.

\* \* \* \* \*